US009453488B2

(12) United States Patent
Qiao et al.

(10) Patent No.: US 9,453,488 B2
(45) Date of Patent: Sep. 27, 2016

(54) DIRECT INJECTION SOLENOID INJECTOR OPENING TIME DETECTION

(71) Applicant: Continental Automotive Systems, Inc., Auburn Hills, MI (US)

(72) Inventors: Ningsheng Qiao, Troy, MI (US); Nicholas Moore, Troy, MI (US); Francois Fabre, Pino Torinese (IT)

(73) Assignee: Continental Automotive Systems, Inc., Auburn Hills, MI (US)

( * ) Notice: Subject to any disclaimer, the term of this patent is extended or adjusted under 35 U.S.C. 154(b) by 220 days.

(21) Appl. No.: 14/515,052

(22) Filed: Oct. 15, 2014

(65) Prior Publication Data

US 2015/0114099 A1 Apr. 30, 2015

Related U.S. Application Data

(60) Provisional application No. 61/896,710, filed on Oct. 29, 2013.

(51) Int. Cl.

*G01M 15/04* (2006.01)
*F02M 65/00* (2006.01)
*F02D 41/20* (2006.01)

(52) U.S. Cl.

CPC ............ *F02M 65/005* (2013.01); *F02D 41/20* (2013.01); *F01N 2900/1821* (2013.01); *F02D 2041/2034* (2013.01); *F02D 2041/2055* (2013.01); *F02D 2041/2058* (2013.01)

(58) Field of Classification Search

CPC .. F02M 65/001; F02M 65/005; G01M 15/04
USPC .......................................... 73/114.45, 114.49
See application file for complete search history.

(56) References Cited

U.S. PATENT DOCUMENTS

| | | | | |
|---|---|---|---|---|
| 4,140,084 | A * | 2/1979 | Di Nunzio | F02D 41/20 123/490 |
| 5,535,621 | A | 7/1996 | Glidewell et al. | |
| 5,941,209 | A | 8/1999 | Hashimoto | |
| 5,988,143 | A | 11/1999 | Dietz et al. | |
| 6,115,727 | A | 9/2000 | Schooler et al. | |
| 7,152,594 | B2 | 12/2006 | Anilovich et al. | |
| 7,677,086 | B2 | 3/2010 | Albertson et al. | |
| 7,802,563 | B2 | 9/2010 | Behr et al. | |
| 8,880,276 | B2 | 11/2014 | Qiao et al. | |

(Continued)

FOREIGN PATENT DOCUMENTS

| | | | |
|---|---|---|---|
| DE | 3611220 | A1 | 1/1987 |
| DE | 19730594 | C2 | 8/1999 |

(Continued)

OTHER PUBLICATIONS

European Patent Office Search Report dated Nov. 4, 2015, EP 14 18 9880.

(Continued)

*Primary Examiner* — Eric S McCall

(57) ABSTRACT

A direct injection, solenoid fuel injector includes at least one current sensing function capable of detecting a current draw of the solenoid and a controller function. The controller is capable of determining a fully open time of the direct fuel injector solenoid based on the application of a slope inflection filter and a slope discrimination filter to a derivative of the current draw.

20 Claims, 6 Drawing Sheets

(56) References Cited

U.S. PATENT DOCUMENTS

| | | | |
|---|---|---|---|
| 2005/0066940 A1 | 3/2005 | Sheikh et al. |
| 2007/0277777 A1 | 12/2007 | Barnes et al. |
| 2011/0170224 A1 | 7/2011 | Gietler et al. |
| 2012/0296551 A1 | 11/2012 | Kabasin |
| 2013/0180323 A1 | 7/2013 | Peucat et al. |
| 2014/0190453 A1 | 7/2014 | Qiao et al. |
| 2015/0113950 A1 | 4/2015 | Qiao et al. |
| 2015/0128568 A1 | 5/2015 | Barbier et al. |

FOREIGN PATENT DOCUMENTS

| | | | |
|---|---|---|---|
| DE | 4308811 | B9 | 8/2004 |
| DE | 102011078161 | A1 | 9/2012 |
| EP | 0878617 | B1 | 5/2003 |
| EP | 2060763 | A1 | 5/2009 |
| EP | 2060763 | A2 | 5/2009 |
| EP | 2585692 | B1 | 4/2014 |
| JP | 62599 | A | 1/1994 |
| JP | 10501597 | A | 2/1998 |
| JP | 2001221121 | A | 8/2001 |
| JP | 2003262149 | A | 9/2003 |
| JP | 2005061583 | A1 | 3/2005 |
| JP | 2007173158 | A | 7/2007 |
| JP | 2009121482 | A | 6/2009 |
| JP | 2010532448 | A | 10/2010 |
| JP | 201420287 | A | 2/2014 |
| JP | 201431731 | A | 2/2014 |
| JP | 2014163475 | A | 9/2014 |
| KR | 1019990020511 | A | 1/2001 |
| WO | 2013191267 | A1 | 12/2013 |

OTHER PUBLICATIONS

Korean Intellectual Property Office Office Action dated Oct. 22, 2015. 10-2014-0147662.

U.S. Appl. No. 14/323,373, Continental Automotive Systems, Inc.

U.S. Appl. No. 14/689,367, Continental Automotive Systems, Inc.

English Translation of Japanese Office Action dated Feb. 1, 2016, JP 2014-220386.

* cited by examiner

DIRECT INJECTION SOLENOID INJECTOR OPENING TIME DETECTION

PRIORITY CLAIM

This application claims the benefit of U.S. Provisional Application No. 61/896,710 filed on Oct. 29, 2013.

TECHNICAL FIELD

The present disclosure relates generally to injector solenoid controls, and more specifically to a method and apparatus for detecting a precise opening time of an injector solenoid applied for a direct injection system.

BACKGROUND

Modern vehicle controls, such as those used in direct injection or other similar system engine control systems, frequently require a controller to determine or estimate the time the injector solenoid opens. The vehicle systems rely on an injector opening time response in order to predict aspects of the engine system, such as fuel rail pressure. These predictions are made in real time utilizing a linear transfer function.

To properly utilize predictive systems, the engine systems require a reliable detection of injector opening time for each injection, at each stroke. Current control systems also require that the opening time detection have a high accuracy in order to guarantee proper operation.

SUMMARY

Disclosed is a method for detecting a fuel injector solenoid opening time, including detecting a slope inflection in a derivative of a current draw during a data collection period, using slope inflection detection and discrimination filters.

Also disclosed is a vehicle utilizing direct injection solenoid fuel injectors. The vehicle includes at least one current sensing function capable to detect a injector current draw of the and a controller connected to current sensing function. The controller is capable to detect a slope inflection in a derivative of the injector solenoid current draw using slope inflection detection and discriminator filters, thereby detecting the opening time of the injector solenoid.

DETAILED DESCRIPTION OF AN EMBODIMENT

Figure 1:
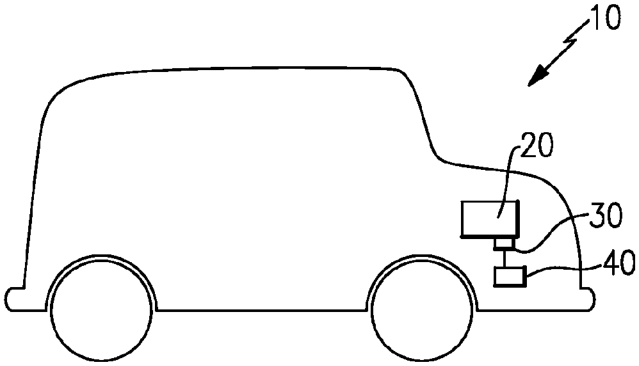
FIG. 1 schematically illustrates a vehicle according to one embodiment of the invention.

FIG. 1 schematically illustrates a vehicle 10 including an internal combustion engine 20. Operation of the engine 20 relies on periodic injections of fuel from a fuel injector solenoid 30 in a process referred to as direct injection. A controller 40, such as an engine controller, controls the injection timing, phasing and splitting and relies on accurate injector opening time response data in order to predict a physical fuel rail pressure in real time. The prediction is calculated according to a linear transfer function that has a good correlation with dependency on temperature.

Existing injectors utilize a combination of empirical data sets and predictive modeling to estimate the response time of the direct injector solenoid 30. While this method can provide adequate results, the predictions are not necessarily precise and include multiple assumptions. Further still, the predictive modeling requires a significant investment of controller processing power. The processing power requires a dedicated injection controller and/or limits alternate functions of the engine controller 40.

The illustrated engine controller 40 includes a slope inflection based injector opening time detector. In one example, the injector opening time detector is a software module. The engine controller 40 detects a current input to the direct injector solenoid 30 using existing sensing functions and constructs a current profile of the direct injector solenoid 30. The current profile is a representation of the direct injector solenoid 30 input current with respect to time.

Figure 2:
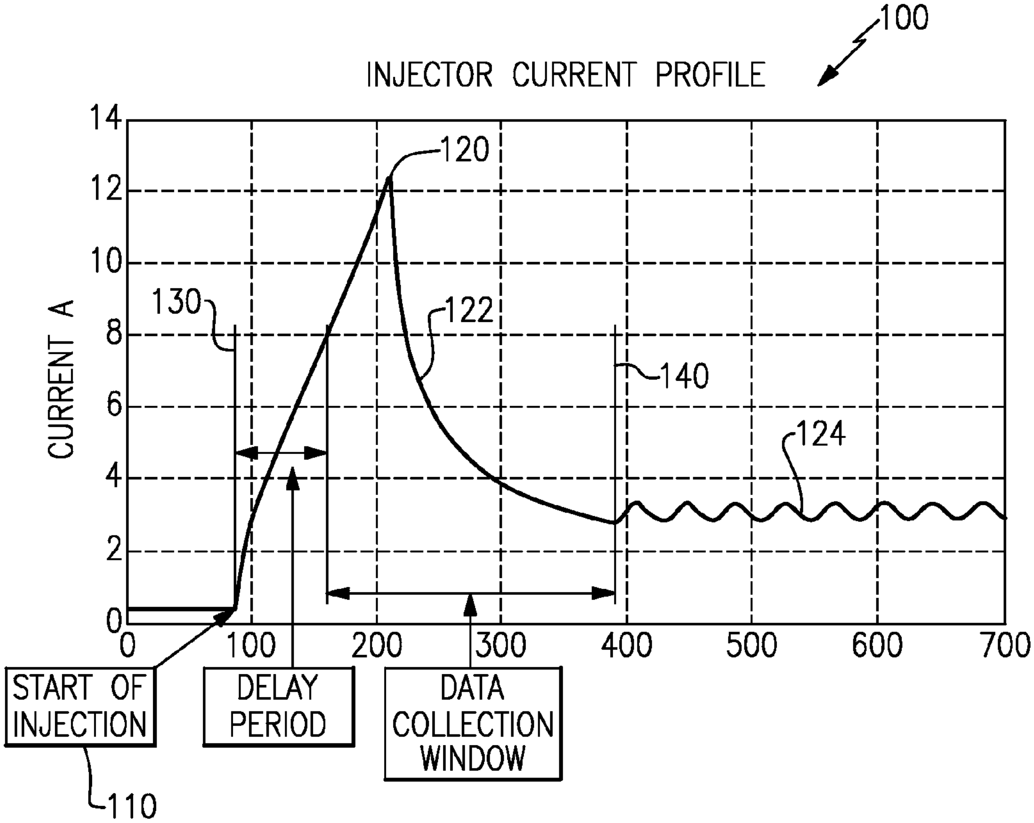
FIG. 2 illustrates a current draw profile of a solenoid direct injection injector.

With continued reference to FIG. 1, and with like numerals indicating like elements, FIG. 2 illustrates an example current profile 100 of a direct injector solenoid 30. The controller 40 initially begins opening the direct injector solenoid 30 at a start of injection 110. Immediately following the start of injection 110, the current profile 100 rapidly rises until it reaches a peak 120. After the peak 120, the current profile 100 begins an exponential decline 122 until the reaching a current holding phase 124.

It is known in the art that a direct injector solenoid 30 is fully open at least a minimum time period after the start of injection. The minimum time period is illustrated as a delay window 130. Once the delay window 130 has passed, the controller 40 begins collecting data from the current profile 100, in order to precisely determine the injector opening time. The current data is collected from the end of the delay window 130 until the beginning of the current holding phase 124. This window of time is referred to as the data collection window 140.

Figure 3:
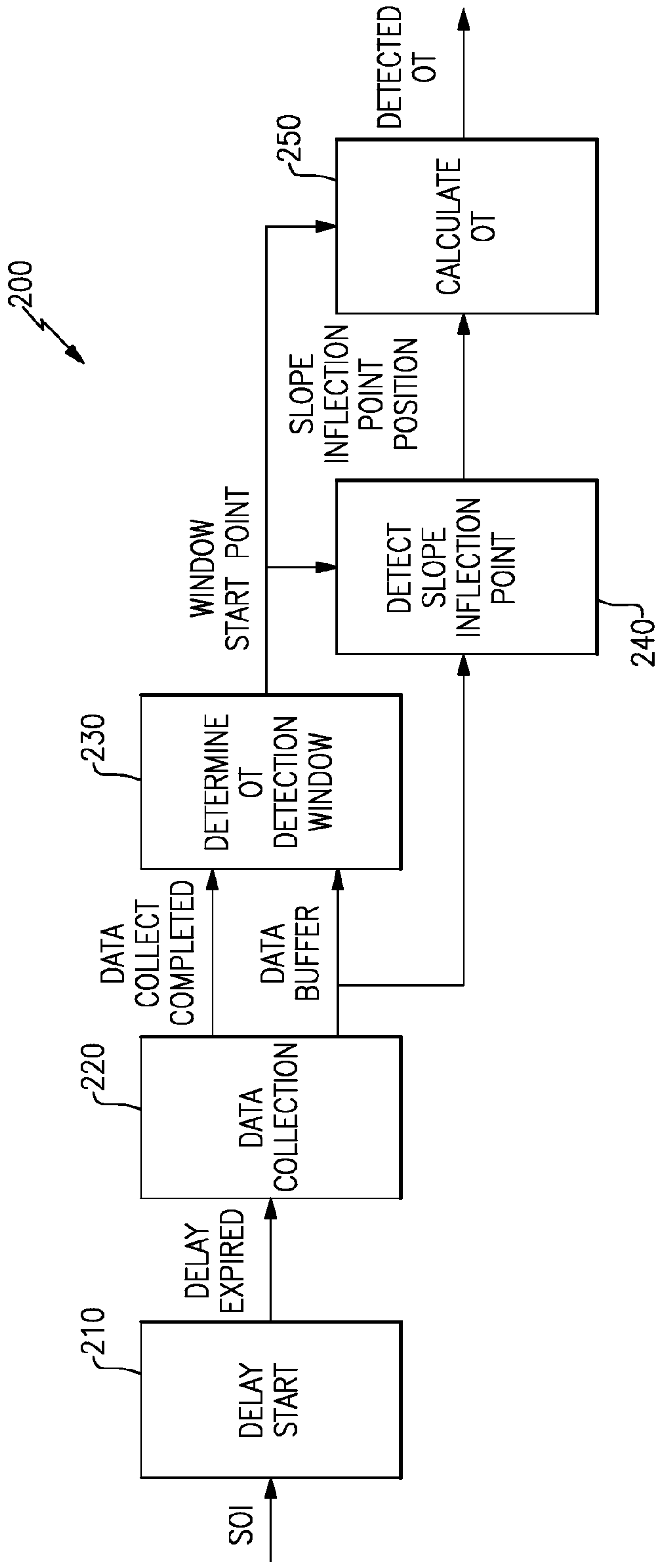
FIG. 3 illustrates a high level flow chart of an injector opening time detection process.
Figure 4:
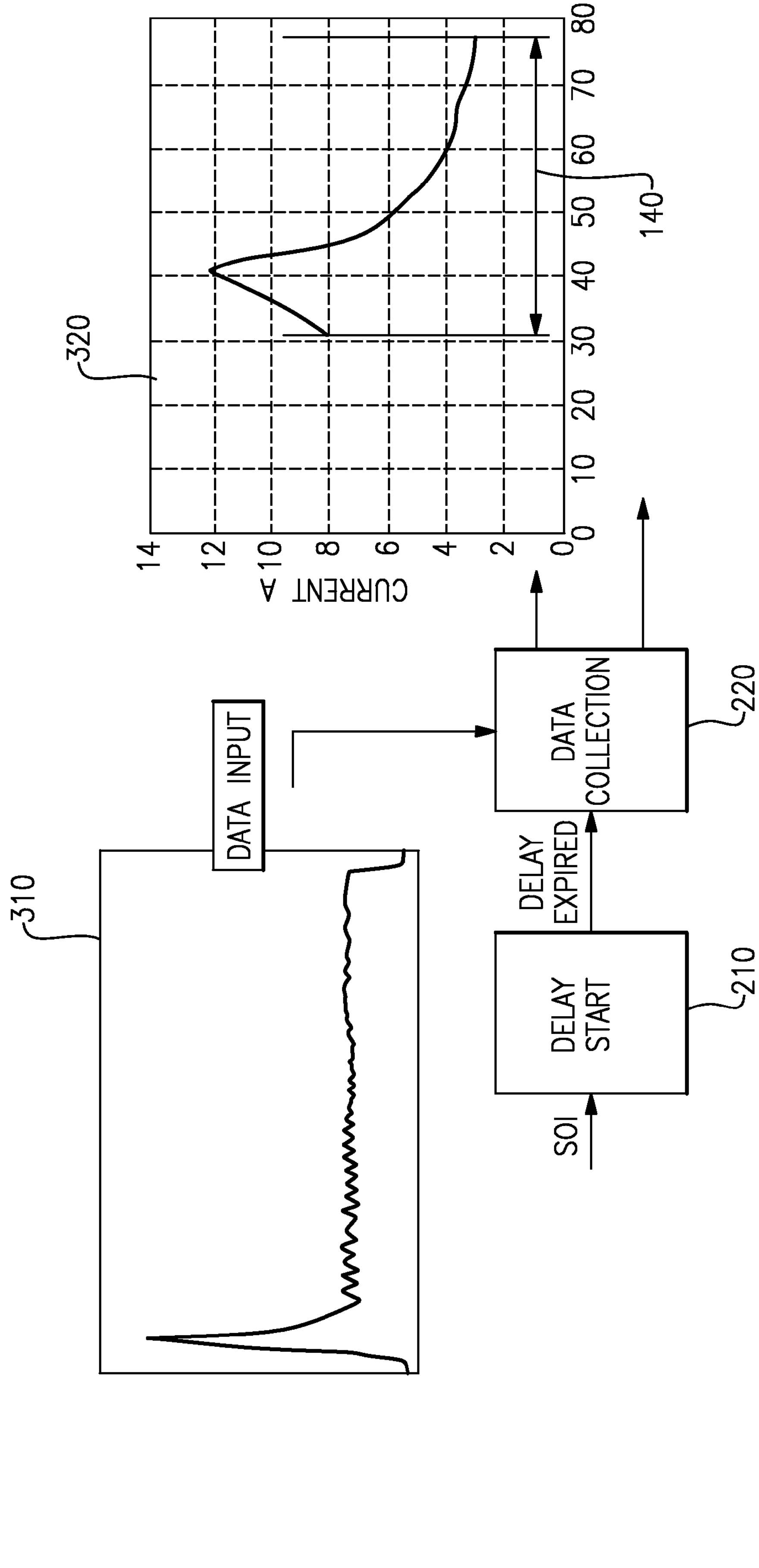
FIG. 4 illustrates the delay start and data collection steps of FIG. 3 in greater detail.

With continued reference to FIGS. 1-2, FIG. 3 illustrates a high level flowchart 200 of the process by which the controller 40 determines the opening time of the direct solenoid injector 30. Upon starting to open the direct solenoid injector 30 at the start of injection 110, the controller 40 delays data collection until after the delay window 130 has elapsed in a delay start step 210.

Figure 5:
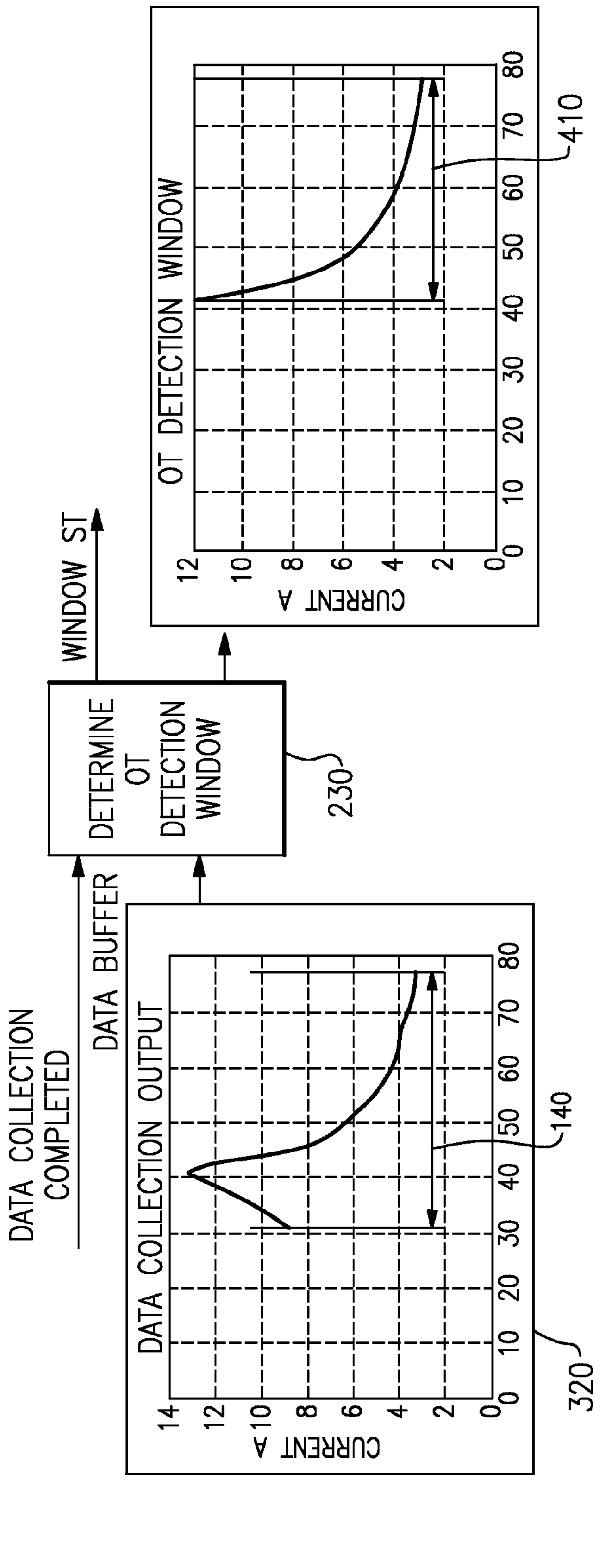
FIG. 5 illustrates the 'determine opening time detection' window step of FIG. 3 in greater detail.
Figure 6:
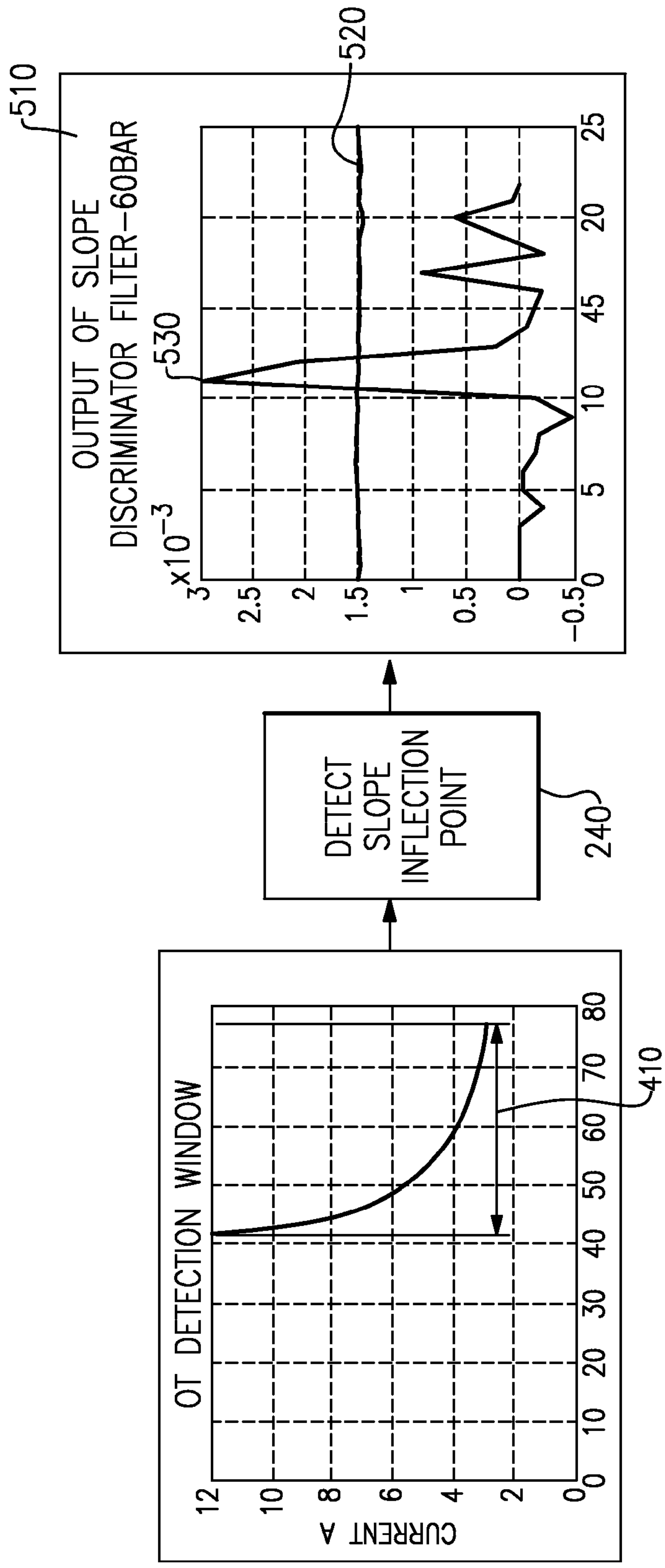
FIG. 6 illustrates the 'detect slope inflection point' step of FIG. 3 in greater detail.

Once the delay window 130 has elapsed, the controller 40 begins data collection in a data collection step 220. The controller 40 collects data for the duration of the data collection window 140 and stores the data collected in a data buffer. Once all the injector opening data has been stored in the data buffer, the controller 40 determines an opening time detection window (illustrated in FIG. 5) in a determine opening time detection window step 230. The opening time detection window is a subset of the data collection window during which it is possible for the injector to have reached a fully open state.

Once the opening time detection window has been determined, the controller 40 discards the data that is outside of the opening time detection window from the buffer and the remaining data is processed with slope inflection and discrimination filters in a 'detect slope inflection' point step 240. The controller 40 identifies the time when the solenoid 30 became fully open based on the timing of the peak of a slope inflection amplified by the slope discrimination filter. The slope inflection filter and the slope discrimination filter are implemented as software modules within the controller 40. In alternate examples, the slope inflection and discrimination filters can be implemented in other vehicle components including a processor capable of performing the corresponding calculations. The determination of the fully open time is made in a calculate opening time step 250. The controller 40 can then output the fully open time to any other system, such as another controller or an on board diagnostic (OBD1/OBD2) system.

With continued reference to FIGS. 1-3, FIG. 4 illustrates the delay start step 210 and the data collection step 220 in greater detail. As described above, with regards to FIG. 3, the delay start step 210 delays the collection of data by the controller 40 until a pre-defined length of time has elapsed from the start of injection. The delay reduces the amount of data stored in a data buffer during the data collection step 220 by reducing the length of the date collection step 220. The decreased amount of data in the data buffer makes the controller 40 operations more efficient. The particular pre-defined length of time is a calibration value that can be determined by one of skill in the art, and should not be longer than a minimum possible opening time of the solenoid.

Once the time delay has passed, a data input 310 is utilized to determine a current profile within the previously described data collection window 140. The data input 310 is a current drawn by the direct injector solenoid 30 and is sampled at a high data sampling rate. A low pass filter is applied to the data to remove high frequency noise. The data is then down sampled from high to low data rate. The rate of the down sampling is configurable and can be adjusted to reflect the particular processing power and speed of the controller 40. Once the data has been fully down sampled, the data is stored in a data buffer and is output from the data collection step 220 as a data output 320.

The illustrated data output 320 is an example data output from the data collection step 220. As can be seen, the data is truncated before the data collection window 140 and after the data collection window 140.

With continued reference to FIGS. 1-4, FIG. 5 illustrates the operations of the determine opening time detection window step 230. The determine opening time detection window step 230 utilizes the data from the data buffer. Depending on injector types, some types of injector openings occur before injector peak current, and others occur after injector peak current. As an example the injector openings discussed occurred after injector peak current. The operations of the determine opening time detection window step 230 can cover both injector types. The controller 40 then calculates the derivative of the data within the data buffer and determines a maximum value of the data within the buffer. As the current holding phase 124 begins at the end of the data collection window 140, the controller 40 determines that the solenoid must become fully open at some point between the maximum value of the data and the start of the current holding phase 124.

The controller 40 sets an opening time detection window 410 as extending from the time of the peak value of the data buffer until the end of the data buffer. The data within the data buffer can again be truncated by eliminating all data outside the opening time detection window 410. This truncation further reduces the amount of data required to be analyzed by the controller 40. Once the opening time detection window 410 has been determined, the controller 40 applies the detect slope inflection point step 240.

With continued reference to FIGS. 1-5, FIG. 6 illustrates the detect slope inflection point step 240 in greater detail. Two specific, non-linear, digital filters are used in this step. The filters are a slope inflection detection filter and a slope discrimination filter. The slope inflection detection filter locates a slope inflection point, and the slope discrimination filter magnifies the slope inflection for threshold detection. In the detect slope inflection point step 240, the controller calculates the derivative of the current profile data contained within the opening time detection window, and applies a slope inflection detection filter first, then a slope discrimination filter (described below with regards to FIG. 7) to the resulting derivative data. An output 510 of the slope discrimination filter is further illustrated in FIG. 6.

Once a slope inflection location is identified with the slope inflection detection filter, the controller 40 applies the slope discrimination filter to amplify a slope inflection, without amplifying other variations in the data. By applying the slope discrimination filter, the controller 40 generates the slope inflection output 510. A predefined threshold 520 is stored in a memory of the controller 40. The sole peak 530 above the predefined threshold 520 indicates the presence of a slope inflection, with the peak point being the occurrence of the slope inflection.

Once the slope inflection point 530 has been determined, the injector opening time is calculated by the controller 40 according to the following relationship:

Opening time=(window start+peak position+processing offset+filter delay)*down sampled data sample rate.

With the window start being the time at which the controller 40 begins the opening time detection window, the peak position 530 being the time at which the slope inflection detector output 510 peaks, the processing offset and the filter delay being constants, and the data sample rate being the rate at which the current profile data has been down sampled. The processing offset constant and the filter delay constant are calibration constants that are calibrated depending on the particulars of the given system. Specific processing offset constants and filter delay constants for any given system can be calculated by one of skill in the art having the benefit of this disclosure.

Once the opening time has been determined by the controller 40 in the calculate opening time step 250, the controller 40 can output the injector solenoid 30 opening time to other sub-routines within the controller 40, to another engine controller, to an engine diagnostics system (OBD1/OBD2), or to any other vehicle system.

Figure 7:
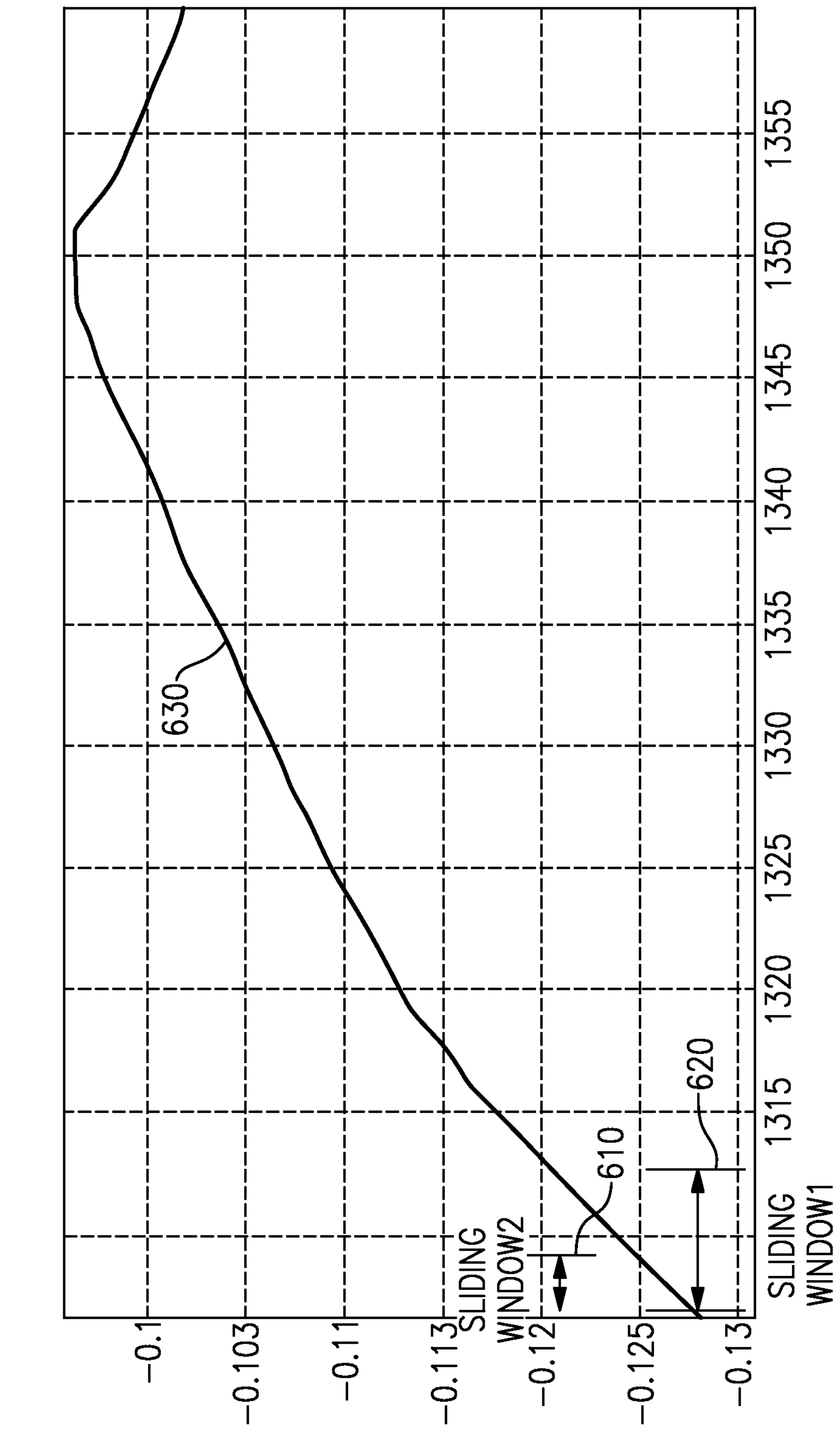
FIG. 7 illustrates the operation of a slope discrimination filter.

With continued reference to FIGS. 1-6, and with like numerals indicating like elements, FIG. 7 illustrates the principles of operation of the slope inflection detection filter and the slope discrimination filter described above.

Both the slope inflection detection filter and the slope discrimination filter utilize two synchronized sliding windows, a mean window 610 and a median window 620, to detect and amplify a slope inflection. The median window 620 is a larger window and fully encompasses the mean window 610. Both windows 610, 620 slide through the derivative of the data within the opening time detection window (alternately referred to as the detection signal 630) entry by entry at the same time, doing slope calculation and nonlinear filtering, over the entire detection signal 630 the data in the median window 620 is sorted before calculating a mean term. A median term is calculated in median window 620 entry by entry. A mean term is calculated in mean window 610 entry by entry.

The size of both the mean window 610 and the median window 620 are calibration values that can be experimentally or mathematically determined for a particular injection solenoid 30 by one of skill in the art having the benefit of this disclosure.

The value of the output of the slope inflection detection filter is determined by the following relationship:

$$\text{Out}=\text{mid}*d_{fact}-(\text{mean}*g_{fact}).$$

Where Out is the output value, mid is the center value of the data points in the median window 620 once the data points in the median window 620 have been sorted in ascending order, mean is the mean value of the data points in the mean window 610, and $d_{fact}$ and $g_{fact}$ are variable factors. $d_{fact}$ and $g_{fact}$ are determined by the following relationships:

$$g_{fact}=1+\text{ABS}(\text{mid}-\text{mean})$$

$$d_{fact}=1-\text{ABS}(\text{mid}-\text{mean})$$

Where mid is the center value of the data points in the median window 620 once the data points in the median window 620 have been sorted in ascending order, mean is the mean value of the data points in the mean window 610, and ABS is the absolute value function.

As a result of the above relationships, the bigger the difference between the value of the median window 620 (mid) and the mean window 610 (mean), the greater the factor $g_{fact}$ will be. Similarly, the bigger the difference between the value of the median window 620 (mid) and the mean window 610 (mean), the smaller factor $d_{fact}$ will be. This difference in $g_{fact}$ and $d_{fact}$ results in an output (out) that greatly magnifies a slope inflection.

The value of the output of the slope discrimination filter is determined by the following relationship:

$$\text{Output}=\text{Mid}*G_{fact}-(\text{Mean}*d_{fact}-\text{Offset})$$

Where Mid, Mean, $G_{fact}$, and $d_{fact}$ are the previously described terms and Offset is determined by the following relationship:

$$\text{Offset}=\text{ABS}(\text{Mid}-\text{Mean})/(\text{length of mean window})$$

Where Mid and Mean have their previously described definitions and the length of mean window is the time encompassed by the mean window 610. ABS is the absolute value function.

Further, as previously described $G_{fact}$, and $d_{fact}$ are variable gain terms with $G_{fact}$ always being greater than 1, and $d_{fact}$ always being less than 1. The offset term is related to the difference between the Median term (mid) and the mean term (mean).

While the above process is described with regards to a direct injection engine control system, it is understood that the process can be applied by alternate controllers to determine an accurate solenoid opening time for any similar system and is not limited to fuel injection timing controls.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for detecting an injector solenoid fully open time comprising:

detecting a slope inflection in a derivative of a current draw of the injector solenoid during a data collection period using a slope inflection detection filter and a slope discriminator filter, thereby detecting a fully open time of a direct injector solenoid.

2. The method of claim 1, wherein the data collection period begins after a delay window has elapsed, and wherein the delay window is a minimum solenoid opening time.

3. The method of claim 1, further comprising sampling a current input of a direct injector solenoid at a high sampling rate, thereby determining the current input profile.

4. The method of claim 1, further comprising outputting the determined solenoid opening time to at least one vehicle electronic system.

5. The method of claim 4, further comprising down sampling data collected in said data collection period prior to determining the fully open time of a direct injector solenoid.

6. The method of claim 1, wherein detecting a slope inflection in a derivative of a current draw of the injector solenoid during a data collection period using the slope inflection detection filter and the slope discriminator filter comprises:

collecting current draw data for a duration of a data collection window;

determining an opening time detection window within said data collection window; and processing data within the opening time detection window using the slope inflection filter and the slope discrimination filter.

7. The method of claim 6, wherein determining an opening time detection window within said data collection window comprises:

determining a maximum data point within said data collection window and starting the opening time detection window at said maximum data point; and determining a start time of a current holding phase and ending the opening time detection window at the start time of the current holding phase.

8. The method of claim 6, further comprising discarding data outside of said opening time detection window prior to processing data within the opening time detection window.

9. The method of claim 6, wherein processing data within the opening time detection window using the slope inflection filter and the slope discrimination filter comprises identifying a slope inflection location by:

calculating a derivative of the data within the opening time detection window thereby determining a derivative data set;

applying a slope inflection filter to each data point in said derivative data set, thereby identifying possible slope inflections;

applying a slope discrimination filter to each data point in said slope inflection data set, thereby magnifying each of said possible slope inflections; and comparing each of said magnified possible slope inflections to a threshold and identifying an actual slope inflection occurrence where a magnified possible slope inflection crosses said threshold.

10. The method of claim 9, determining the fully open time of the direct injector solenoid based on the time of the actual slope inflection occurrence in the slope discrimination data set.

11. The method of claim 9, further comprising defining a median window and a mean window within the derivative data set, wherein the median window and the mean window are synchronized sliding windows and wherein the mean window is encompassed by the median window.

12. The method of claim 11, wherein an output of the slope inflection filter for a given data point in the derivative data set is defined by the relationship $Out_{inflection}=mid*d_{fact}-(mean*g_{fact})$ where $Out_{inflection}$ is the output value of the slope inflection filter, mid is the center value of data points in a derivative data set median window centered on the data point sorted in ascending order, mean is a mean value of data points in a derivative data set mean window centered on the data point, and $d_{fact}$ and $g_{fact}$ are determined by the following relationships:

$$g_{fact}=1+ABS(mid-mean)$$

$$d_{fact}=1-ABS(mid-mean)$$

where ABS is the absolute value function.

13. The method of claim 11, wherein an output of the slope discrimination filter is defined by the relationship Output=Mid*$G_{fact}$-(Mean*$d_{fact}$-Offset) where output is the output of the slope discrimination filter, mid is the center value of data points in a derivative data set median window sorted in ascending order, mean is a mean value of data points in a derivative data set mean window, and $d_{fact}$ and $g_{fact}$ are determined by the following relationships:

$$g_{fact}=1+ABS(mid-mean)$$

$$d_{fact}=1-ABS(mid--mean)$$

where ABS is the absolute value function and where Offset is determined by the following relationship:

$$Offset=ABS(mid-mean)/(length\ of\ mean\ window)$$

where length of mean window is the time encompassed by the mean window.

14. A vehicle including direct fuel injector solenoid comprising:

at least one current sensor operable to detect a current draw of the injector solenoid; and a controller connected to the at least one current sensor, said controller being operable to detect a slope inflection in a derivative of a current draw of the injector solenoid using a slope inflection detection filter and a slope discriminator filter, thereby detecting a fully open time of the direct injector solenoid.

15. The vehicle of claim 14, wherein detecting a slope inflection in a derivative of a current draw of the injector solenoid during a data collection period using a slope inflection detection filter and a slope discriminator filter comprises:

collecting current draw data for a duration of a data collection window;

determining an opening time detection window within said data collection window; and processing data within the opening time detection window using the slope inflection filter and the slope discrimination filter.

16. The vehicle of claim 15, wherein processing data within the opening time detection window using the slope inflection filter and the slope discrimination filter comprises identifying a slope inflection location by:

calculating a derivative of the data within the opening time detection window thereby determining a derivative data set;

applying a slope inflection filter to each data point in said derivative data set, thereby identifying possible slope inflections;

applying a slope discrimination filter to each data point in said slope inflection data set, thereby magnifying each of said possible slope inflections; and comparing each of said magnified possible slope inflections to a threshold and identifying an actual slope inflection occurrence where a magnified possible slope inflection crosses said threshold.

17. The vehicle of claim 16, determining the fully open time of the direct injector solenoid based on the time of the actual slope inflection occurrence in the slope discrimination data set.

18. The vehicle of claim 16, further comprising defining a median window and a mean window within the derivative data set, wherein the median window and the mean window are synchronized sliding windows and wherein the mean window is encompassed by the median window.

19. The vehicle of claim 18, wherein an output of the slope inflection filter for a given data point in the derivative data set is defined by the relationship $Out_{inflection}=mid*d_{fact}-(mean*g_{fact})$ where $Out_{inflection}$ is the output value of the slope inflection filter, mid is the center value of data points in a derivative data set median window centered on the data point sorted in ascending order, mean is a mean value of data points in a derivative data set mean window centered on the data point, and $d_{fact}$ and $g_{fact}$ are determined by the following relationships:

$$g_{fact}=1+ABS(mid-mean)$$

$$d_{fact}=1-ABS(mid-mean)$$

where ABS is the absolute value function.

20. The vehicle of claim 18, wherein an output of the slope discrimination filter is defined by the relationship Output=Mid*$G_{fact}$-(Mean*$d_{fact}$-Offset) where output is the output of the slop discrimination filter, mid is the center value of data points in a derivative data set median window sorted in ascending order, mean is a mean value of data points in a derivative data set mean window, and $d_{fact}$ and $g_{fact}$ are determined by the following relationships:

$$g_{fact}=1+ABS(mid-mean)$$

$$d_{fact}=1-ABS(mid-mean)$$

where ABS is the absolute value function and where Offset is determined by the following relationship:

$$Offset=ABS(mid-mean)/(length\ of\ mean\ window)$$

where length of mean window is the time encompassed by the mean window.

* * * * *